(12) United States Patent
Biala et al.

(10) Patent No.: US 11,694,543 B2
(45) Date of Patent: Jul. 4, 2023

(54) SYSTEM AND METHOD FOR DATA OFFLOADING AND UPLOADING TO EXCHANGE DATA BETWEEN NODES OF A VEHICLE TRAFFIC INFRASTRUCTURE SYSTEM

(71) Applicant: Argo AI, LLC, Pittsburgh, PA (US)

(72) Inventors: Ilan Biala, Pittsburgh, PA (US); Michel Laverne, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 338 days.

(21) Appl. No.: 17/087,903

(22) Filed: Nov. 3, 2020

(65) Prior Publication Data
US 2022/0139209 A1   May 5, 2022

(51) Int. Cl.
| | |
|---|---|
| G08G 1/01 | (2006.01) |
| G06F 8/65 | (2018.01) |
| H04W 84/18 | (2009.01) |
| G06N 20/00 | (2019.01) |
| H04W 4/44 | (2018.01) |
| G06F 18/214 | (2023.01) |

(52) U.S. Cl.
CPC ............ *G08G 1/012* (2013.01); *G06F 8/65* (2013.01); *G06F 18/214* (2023.01); *G06N 20/00* (2019.01); *G08G 1/0137* (2013.01); *H04W 4/44* (2018.02); *H04W 84/18* (2013.01)

(58) Field of Classification Search
CPC ........ G08G 1/012; G08G 1/0137; G06F 8/65; G06F 18/214; G06N 20/00; H04W 4/44; H04W 84/18
See application file for complete search history.

(56) References Cited

U.S. PATENT DOCUMENTS

| | | |
|---|---|---|
| 6,792,345 B2 | 9/2004 | Matsumoto et al. |
| 8,300,564 B2 | 10/2012 | Grimm et al. |
| 9,769,865 B2 | 9/2017 | Blanksby et al. |
| (Continued) | | |

OTHER PUBLICATIONS

Bergmann, P. et al., "Tracking Without Bells and Whistles", Proc. of the IEEE International Conference on Computer Vision (ICCV), Seoul, Korea, Oct. 2019.
(Continued)

*Primary Examiner* — Aniss Chad
*Assistant Examiner* — Christine Nguyen Huynh
(74) *Attorney, Agent, or Firm* — Fox Rothschild LLP

(57) ABSTRACT

A method of transferring data between an autonomous vehicle and a vehicle traffic control infrastructure system. The method includes receiving, by a communication device of a vehicle, a data payload for a smart traffic control infrastructure node. The method includes, by a computing device of the vehicle: determining that the vehicle is or will be within a communication range of the smart traffic control infrastructure node, determining a length of time that the vehicle will be in the communication range of the smart traffic control infrastructure node, and assembling a communication package with at least a portion of the data payload that can be transferred in the determined length of time. The method includes, by a communication device of the vehicle when the vehicle has an ad hoc communication link with the smart traffic control infrastructure node, transmitting the assembled communication package to the smart node.

27 Claims, 6 Drawing Sheets

(56) References Cited

U.S. PATENT DOCUMENTS

| | | | |
|---|---|---|---|
| 10,140,527 B2 | 11/2018 | Han et al. | |
| 2003/0063015 A1 | 4/2003 | Ebner et al. | |
| 2017/0124864 A1* | 5/2017 | Popple | G08G 1/096783 |
| 2017/0141968 A1 | 5/2017 | Lloyd et al. | |
| 2018/0165085 A1 | 6/2018 | Carter | |
| 2018/0184278 A1* | 6/2018 | Kim | H04W 48/10 |
| 2019/0176828 A1 | 6/2019 | Weiser | |
| 2020/0312142 A1* | 10/2020 | Su | G05D 1/0285 |
| 2021/0217309 A1* | 7/2021 | Cronie | H04L 63/107 |

OTHER PUBLICATIONS

Bhandari, R. et al., "DeepLane: Camera-assisted GPS for Driving Lane Detection", Computer Science Proceedings of the 5th Conference on Systems for Built Environments, (2018) pp. 73-82.

Hasan, M. et al., "Securing Vehicle-to-Everything (V2X) Communication Platforms," arXiv:2003.07191v1 [cs NI] Mar. 12, 2020, pp. 1-21.

Guo, J. et al., "Vehicular Ad Hoc Networks and Dedicated Short-Range Communication," University of Michigan—Dearborn, Jun. 26, 2006. pp. 1-56.

Silwa, B. et al., "A Reinforcement Learning Approach for Efficient Opportunistic Vehicle-to-Cloud Data Transfer," Communication Networks Institute, TU Dortmund University, arXiv:2001.05321v1 [cs:NI] Jan. 15, 2020.

* cited by examiner

SYSTEM AND METHOD FOR DATA OFFLOADING AND UPLOADING TO EXCHANGE DATA BETWEEN NODES OF A VEHICLE TRAFFIC INFRASTRUCTURE SYSTEM

BACKGROUND

The present disclosure relates to systems and methods for transferring traffic control data to and from smart infrastructure nodes of a traffic control infrastructure system.

Traffic control systems use smart infrastructure nodes in cities and highways, for example, to collect situational awareness of traffic conditions among other things. Various smart infrastructure nodes may also control traffic light devices based on the prevailing traffic conditions. A smart node at one intersection with a traffic light device may need data from another smart node to determine when to change the device's light from red to green, for example. Because, traffic control systems can have hundreds of these smart nodes distributed about a city, the communications of some smart nodes may be or become blocked by buildings, bridges, etc.

Transferring data to and from smart infrastructure nodes requires either building in a data connection to at least one node in the system and developing software to offload data by itself, or creating a hardwired connection to a centralized node that manages all smart infrastructure nodes. Both methods fall short of providing low-cost, high-throughput solutions to transferring the massive amounts of data gathered and/or generated by smart infrastructure nodes that could be used to improve their operations.

Adding a data connection and developing software to transfer data increases the manufactured cost of the system as well as the maintenance cost to pay for data transfer operations of the system. A data connection that is open and accessible poses a security risk that hackers could exploit by accessing the software which is often a trade secret exposing competitive edge details of a company's system. Additionally, a hardwired connection to a centralized location for all smart infrastructure nodes can be expensive and difficult to maintain, as well as provide scalability challenges as cities continue to grow and smart infrastructure systems continue to become more prevalent. In some instances, it can be prohibitive to add smart infrastructure nodes at certain location which can leave a blind spot in the system for traffic control.

Therefore, for at least these reasons, a better system and method of getting data from one smart node to another smart node or from a remote server and a smart node is needed.

SUMMARY

In some embodiments, a method of transferring data between an autonomous vehicle and a vehicle traffic control infrastructure system is provided. The method may include receiving, by a communication device of a vehicle, a data payload for a smart traffic control infrastructure node. The method may include, by a computing device of the vehicle: determining that the vehicle is or will be within a communication range of the smart traffic control infrastructure node, determining a length of time that the vehicle will be in the communication range of the smart traffic control infrastructure node, and assembling a communication package with at least a portion of the data payload that can be transferred in the determined length of time. The method may include, by a communication device of the vehicle when the vehicle has an ad hoc communication link with the smart traffic control infrastructure node, transmitting the assembled communication package to the smart node.

In various embodiments, the receiving the data payload may include doing so from one of the following: a remote server; a peer data carrier device; or another smart traffic control infrastructure node.

In various embodiments, the method may further include: by a communication device of the smart traffic control infrastructure node, receiving the communication package; by a processor of the smart traffic control infrastructure node, updating memory or software of the smart node with the received portion of the data payload in the communication package; and by the processor of the smart traffic control infrastructure node, tracking an identifier associated with the received portion of the data payload.

In various embodiments, the vehicle travels a route. The route may include repeating a route portion of the route along which the smart traffic control infrastructure node is located. The method may further include, by the computing device of the vehicle, while the vehicle is repeating the route portion of the route: detecting that the vehicle is within the communication range of the smart traffic control infrastructure node, determining that the data payload includes a second portion that was not transmitted to the smart traffic control infrastructure node in the assembled communication package, and assembling a second communication package with the second portion of the data payload for transmission. The method may further include, by the communication device of the vehicle, transmitting the second communication package with the second portion to the smart traffic control infrastructure node while the vehicle is repeating the route portion and within the communication range of the smart traffic control infrastructure node.

In various embodiments, the method may further include, by the smart node: detecting that the vehicle is within the communication range of the smart node while repeating the route portion, and upon detecting that the vehicle is within the communication range of the smart traffic control infrastructure node while repeating the route portion, retrieving an identifier representative of an amount of previously received data of the payload. The method may include transmitting, by the communication device of the smart traffic control infrastructure node, the retrieved identifier to the communication device of the vehicle.

In various embodiments, the method may further include, by the communication device of the vehicle, receiving a node's data payload from the smart node and determining a transfer destination for transfer of the node's data payload. The method may include, by the communication device of the vehicle, performing one or more of the following: (i) connecting to a remote server to transfer the received node's data payload, in response to the determined transfer destination being the remote server; (ii) connecting to another smart node to transfer the received node's data payload, in response to the determined transfer destination being the another smart node; or (iii) connecting to a peer data carrier device to transfer the received node's data payload, in response to the determined transfer destination being the peer data carrier device.

In various embodiments, the method may further include, by the communication device of the vehicle, communicatively connecting to a central dock. The receiving of the data payload may include receiving the data payload from a server via the central dock.

In various embodiments, the method may further include, by the computing device of the vehicle: detecting that a peer data carrier device is within the communication range of the vehicle; determining a second length of time that the peer data carrier device will be in communication with the vehicle; and assembling a second communication package with at least a second portion of the data payload that can be transmitted to the peer data carrier device during the determined second length of time. The method may include, by the communication device of the vehicle, engaging in a peer-to-peer communication session with the peer data carrier device and transferring the second communication package to the peer data carrier device during the session.

In various embodiments, the method may further include, by the computing device of the peer data carrier device: determining that the peer data carrier device is or will be within a communication range of the smart traffic control infrastructure node; determining a length of time that the peer data carrier device will be in communication with the smart traffic control infrastructure node; and assembling a third communication package with at least a portion of one of the second portion of the data payload received from the vehicle. The method may include, by a communication device of the peer data carrier device, while the peer data carrier device is within the communication range of the smart traffic control infrastructure node, transmitting the third communication package to the smart traffic control infrastructure node for the determined length of time.

In various embodiments, the data payload may include at least one of the following: a software update for the smart traffic control infrastructure node; or training data for the smart traffic control infrastructure node to train a model used in machine learning.

In some embodiments, a vehicle may include: a sensor configured to sense a location along a route; a processor; a communication device; and a computer readable medium having programming instructions. The instructions, when executed, will cause the processor to: receive a data payload for a smart traffic control infrastructure node, during a run of the vehicle, determine when the vehicle is or will be within communication range of the smart traffic control infrastructure node, determine a length of time that the vehicle will be in a communication range of the smart traffic control infrastructure node, assemble a communication package with at least a portion of the data payload, and while the vehicle has an ad hoc communication link with the smart traffic control infrastructure node, cause the communication device to transmit the assembled communication package to the smart traffic control infrastructure node.

In various embodiments, the programming instructions are further configured to cause the processor to: track an amount of data of the data payload transferred to the smart traffic control infrastructure node.

In various embodiments, the programming instructions are further configured to cause the processor to: while the vehicle is repeating a portion of the route that is within communication range of the smart traffic control infrastructure node: detect that the vehicle is again within the communication range of the smart traffic control infrastructure node, determine that the data payload includes a second portion that was not transmitted to the smart traffic control infrastructure node in the assembled communication package, assembling a second communication package with the second portion of the data payload for transmission; and cause the communication device to transmit the second communication package with the second portion to the smart traffic control infrastructure node while the vehicle is repeating the portion of the route that is within the communication range of the smart traffic control infrastructure node.

In some embodiments, additional programming instructions are provided that are configured to cause the processor to: detect that the communication device has received a node's data payload from the smart traffic control infrastructure node; and determine a transfer destination for the node's data payload. The transfer destination may include one or more of the following: (i) a remote server, (ii) another smart node, or (iii) a peer data carrier device. The additional programming instructions may also cause the processor to upon detecting that the communication device has communicatively connected to the transfer destination, cause the communication device to transfer the node's data payload to the transfer destination.

In various embodiments, the communication device is also configured to communicatively connect to a central dock. The system may also include additional programming instructions configured to cause the processor to, upon detecting that the communication device has communicatively connected to the central dock, do one or more of the following: receive the data payload from a server via the central dock; or transfer a node's data payload received from the smart traffic control infrastructure node to the server via the central dock.

In various embodiments, the computer readable medium has additional programming instructions that, when executed, will further cause the processor to: detect that a peer data carrier device is within the communication range of the vehicle; determine a second length of time that the peer data carrier device will be in communication with the vehicle; assemble a second communication package with at least a second portion of the data payload that can be transmitted to the peer data carrier device during the determined second length of time; and cause the communication device of the vehicle to engage in a peer-to-peer communication session with the peer data carrier device and transfer the second communication package to the peer data carrier device during the session.

In various embodiments, the vehicle may further include: a vehicle body; a camera that is attached to the vehicle body and configured to capture image data of an environment along the route on which the vehicle is traveling; and one or more other sensors attached to the vehicle body and configured to capture other sensed data along the route. The communication device may also be configured to transfer the captured image data and the other sensed data to the remote server.

In some embodiments, a method of transferring data between an autonomous vehicle and a vehicle traffic control infrastructure system is provided. The method may include receiving, by a communication device of a vehicle, a data payload for a smart traffic control infrastructure node. The method may include, by a computing device of the vehicle: determining that the vehicle is or will be within a communication range of the smart traffic control infrastructure node, receiving, from the smart traffic control infrastructure node via an ad hoc communication link, an identifier of the data payload and an indication of an amount of the data payload that the smart traffic control infrastructure node has already received, and assembling a communication package with at least a portion of the data payload has not already received. The method may include, by a communication device of the vehicle when the vehicle has the ad hoc communication link with the smart traffic control infrastructure node, transmitting the assembled communication package to the smart node.

In various embodiments, the data payload may include training data for the smart traffic control infrastructure. The method may further includes training, by a processor of the smart traffic control infrastructure node, a model with the training data. The model may be used in machine learning.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

Other terms that are relevant to this disclosure are defined at the end of this Detailed Description section.

Opportunistic data offloading and uploading (hereby referred to as "transfer") may involve creating a temporary, ad hoc data connection to data carrier devices registered on the same smart infrastructure network when they are within range and offloading data to other data carrier devices over unmetered (or lower cost) connections such as Wi-Fi, BLUETOOTH, Dedicated Short Range Communications (DSRC), or C-V2X. Then, the receiving data carrier device can either create its own ad hoc connection to continue the opportunistic transfer chain or will transfer the data when it gets to a hardwired, unmetered connection or other dedicated connection.

In this document, the term "data carrier device" refers to a mobile electronic device with a memory device and transceiver for receiving data from an external system and/or transferring the data to an external system. A "data carrier device" may include a vehicle with a memory device and communication device capable of using a wireless short range communication protocol to onboard and offload data. The vehicle may include a bus, automobile, taxi, bicycle, scooter, watercraft, or manned or unmanned aerial vehicle. The vehicle may be an autonomous vehicle or a semi-autonomous vehicle. In addition or alternatively, a "data carrier device" may be a mobile communication device that is carried by a vehicle or a person, such as a smart phone, tablet computing device, laptop computing device or a wearable computing device such as a smart watch.

The opportunistic data opportunistic data offloading and uploading of data to smart traffic control infrastructure nodes can be for improved data gathering, performance/energy efficiency improvements, or other software deployment.

Figure 1:
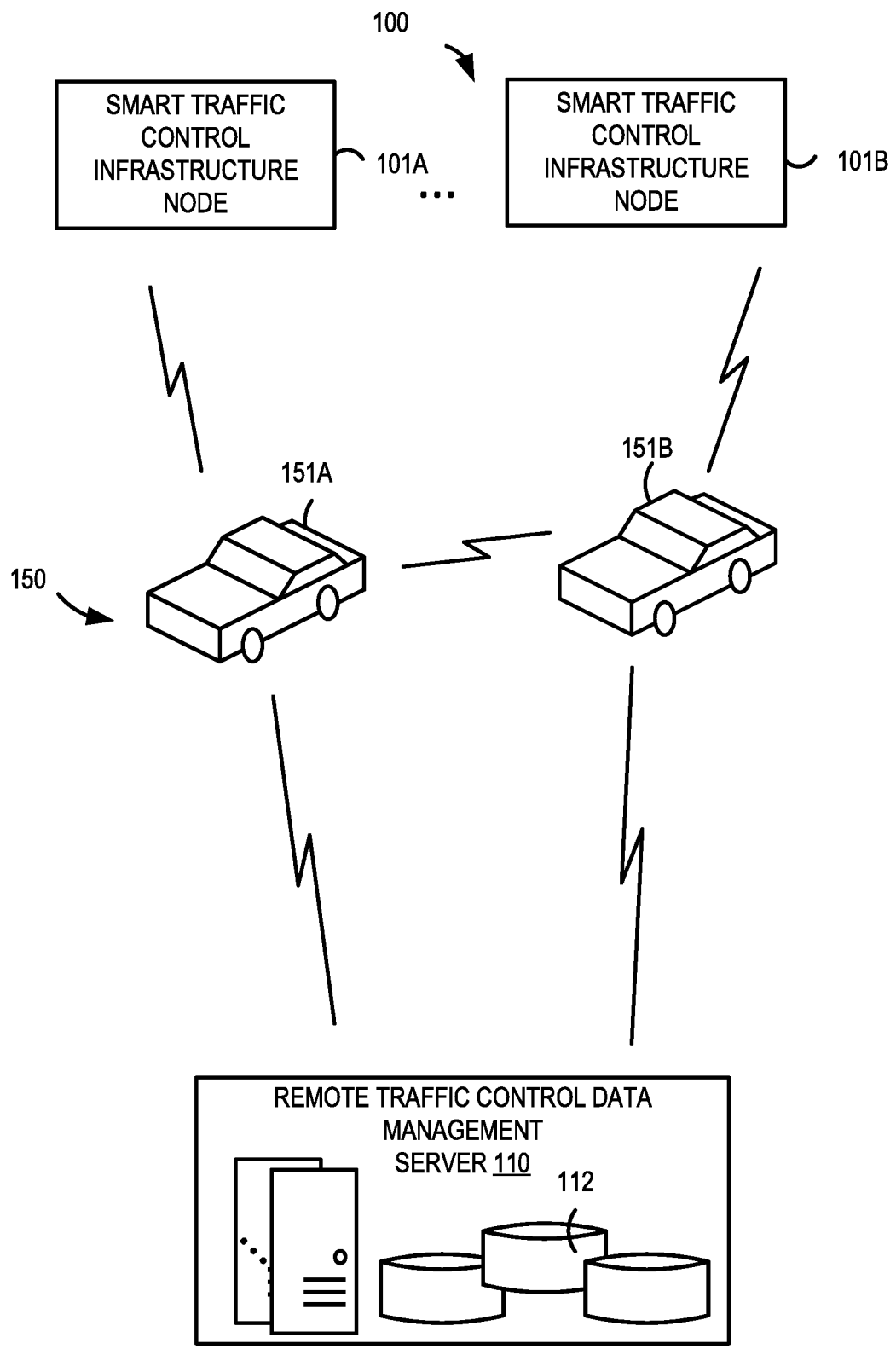
FIG. 1 is an example system for opportunistic data transfer to smart traffic control infrastructure nodes, in accordance with various embodiments of the present disclosure.

Referring now to FIG. 1, a system 100 for opportunistic data transfer to smart traffic control infrastructure nodes 101A and 101B is illustrated. A smart traffic control infrastructure node 101A, 101B (hereinafter sometimes referred to as "smart node") is a device containing a processor, memory, transceiver, optionally one or more sensors such as cameras, and programming instructions that instruct the processor to monitor and collect traffic information, such as a measurement of the number of vehicles over a period of time at a location in a city, a highway, or on a road. The traffic information may be used to control traffic light devices in the location and assist in planning of roads, installation of new traffic light devices and/or parking, by way of non-limiting example. It should be understood, that the system 100 may include many smart nodes, such as at traffic light devices and traffic monitoring devices, such as, on highway signage or elsewhere.

The system 100 may include a remote traffic control data management server 110 (hereinafter sometimes referred to as "server 110") that is configured to update program modules, software, algorithms, data analytics, and maintenance patches associated with the smart node 101A, 101B. These program modules, software, algorithms, data analytics, and maintenance patches may be stored in memory devices 112. The server 110 may be remote from the smart nodes 101A and 101B and data carrier devices 150. The server 110 may not have a direct communication path to the smart nodes 101A and 101B.

These smart nodes 101A and 101B may need to share data with each other. For example, a traffic light device 380 (FIG. 3A) at one intersection may need data from a smart node located at another intersection in order to determine when to change its light from red to green or update traffic light timing due to current traffic conditions or expected traffic conditions. The smart nodes 101A and 101B may also need to receive software updates from time to time, such as without limitation, when the system expands the number of smart nodes or traffic light devices 380.

The server 110 may also be store new program modules or software, data, training data and/or software maintenance patches that must be transferred to various smart nodes 101A, 101B throughout the system. (This document may use the term "data" in the remainder of this discussion to include any computer-readable data and/or programming instructions. "Training data" is data that is used to train a machine learning model to classify objects and identify characteristics of objects that are perceived in the data. Example training data may include images captured by cameras, action sequence histories of traffic lights, data collected by traffic sensors, and the like.) The training data may be generated based on any node's data payload transferred to the server 110 or other data collected by the server 110. The uploaded training data into a smart node by the data carrier devices may cause the smart node to create a new model or update an existing model such as for classification of objects, a new model for traffic analysis, or other models used by the smart node. The training data may include, without limitation, labeled or unlabeled images. The model may be used in machine learning.

The server 110 may provide to a data carrier device 150 different types of payloads for different smart nodes. The server 110 is a payload delivery system that manages and directs the appropriate payloads to various data carrier devices 150, such as based on location tracking information of the carrier device 150 or other information such as a scheduled route. The autonomous vehicles 151A and 151B, the smart nodes 101A and 101B and/or the server 110 may be registered to the system 100. A data carrier device 150 may be configured to receive data from the server 110 when the data carrier device 150 is communicatively connected to the server 110, and perform opportunistic transfer of the uploaded data to one or more smart nodes 101A and 101B when the data carrier device 150 has arrived at a location that enables it to communicatively connect to any of the smart nodes 101A and 101B. The transferred data may include information that is configured to update program modules, software, and maintenance patches of the smart node 101A and/or 101B.

In various embodiments, the server 110 may store new program modules or software, data, training data and/or software maintenance patches that are needed to update the software running on or data sets used by an autonomous or semi-autonomous vehicle. The system 100 may also may use opportunistic transfer of data as disclosed herein to update the autonomous vehicles 151A, 151B using smart nodes 101A and 101B or other peer data carrier devices 150 by having one carrier device (such as vehicle 151A) transfer data to a smart node (such as smart node 101A), and another carrier device (such as vehicle 151B) downloading the data from the smart node when it is in the communication range of the smart node.

The system 100 may need to transfer data from smart node 101A to smart node 101B, or from a server 110 to a smart node, such as smart node 101A or smart node 101B when a smart node cannot find or does not have access to a network connection, for example. Any of the data carrier devices 150 may be used to accomplish this transfer. The description below will describe in general the operation of data carrier device 150. However, because vehicles 151A and 151B are a type of data carrier device 150, the term "vehicle" could be substituted in to "data carrier device" in any part of the discussion below.

Assume that data carrier device 150 may, while traveling a route, deliver software updates and other digital data from server 110 to a smart node 101A or smart node 101B along the route. To do this, data carrier device 150 can obtain digital data from the remote server 110, using an intermediary central dock 120 (FIG. 2) (such as a data transfer port at a taxi or bus depot) or from another data carrier device which has previously received the digital data from the remote server 110. The central dock 120 (FIG. 2) is denoted in dashed lines because it may not be needed for all types of data carrier devices to participate in the system 100. When data carrier device 150 gets within a communication range of smart node 101A, data carrier device 150 establishes a communication link with smart node 101A and offloads the data from the server 110 to smart node 101A. The communication range will be a distance by which the two devices (data carrier and smart node) can establish a communication link via a near-field or short-range wireless communication protocol, such as BLUETOOTH, BLUETOOTH Low Energy (BLE), Wi-Fi, ZIGBEE, Z-Wave and/or other protocols as described below, It should be understood that the same process may take place between data carrier device 150 and smart node 101B to transfer data intended for smart node 101B from the server 110.

In operation, data carrier device 150 may also transfer data between smart node 101A and smart node 101B. When data carrier device 150 is within a communication range of the smart node 101A, smart node 101A can establish a communication link with data carrier device 150 and offload data intended for smart node 101B to data carrier device 150. Then, when data carrier device 150 is within a communication range of smart node 101B, data carrier device 150 can transfer that data from smart node 101A to smart node 101B.

In operation, one or more smart nodes 101A and 101B may also offload its data to data carrier device 150 so that the data carrier device 150 returns the node's offloaded data to the server 110 or central dock 120 (FIG. 2) for return to server 110. The data carrier devices, such as vehicles, may capture images and other sensed data as it travels along a path. The data carrier devices may transfer any sensed data (i.e., captured images or other sensed data) to the remote server 110.

In operation, because the data transfer time is limited, multiple data carrier devices (i.e., vehicles 151A and 151B) may get the complete data payload or data package. When vehicle 151A offloads data to a smart node (i.e., smart node 101A), the smart node 101A may determine how much of the data payload it received, such as by measuring an amount of data (such as a number of bytes in the payload, a number of blocks or packets of data received, or a number of complete files extracted from the payload), or by analyzing the payload and identifying one or more markers within the payload and saving an indicator of the last marker received. Then, when vehicle 151B reaches the smart node 101A, vehicle 151B may transfer a message to the smart node 101A with an identifier of the payload that is available to transfer. The smart node 101A may then reply to vehicle 151B with a message that includes indicia of how much data of the data payload has been received. Vehicle 151B can then transfer all or a portion of any remaining data from the data payload that point forward. For example, if the vehicle 151B offers to the smart node 101A a data payload consisting of 100 megabytes (MB) of a software update version 3.2.2, and smart node 101A replies with a message indicating that it received 40 MB of that update, vehicle 151B may then transfer the portion of that payload that includes megabytes 41 and up, optionally starting at the 40 MB position or an even earlier position (such as 39 MB) in the data to permit some overlap and avoid missing any data at the transition point.

The server 110 may be implemented using hardware, firmware, software or a combination of any of these. For instance, the server 110 may be implemented as part of a microcontroller, processor, and/or graphics processing units. The server 110 may include or interface with a register and/or data store for storing data and programming instructions, which when executed, receives position/location data from a data carrier device 150, determines a data payload for a smart node 101A, 101B and transmits such data payload to the data carrier device via central dock 120 (FIG. 2) or other communication system, such as the Internet.

Figure 2:
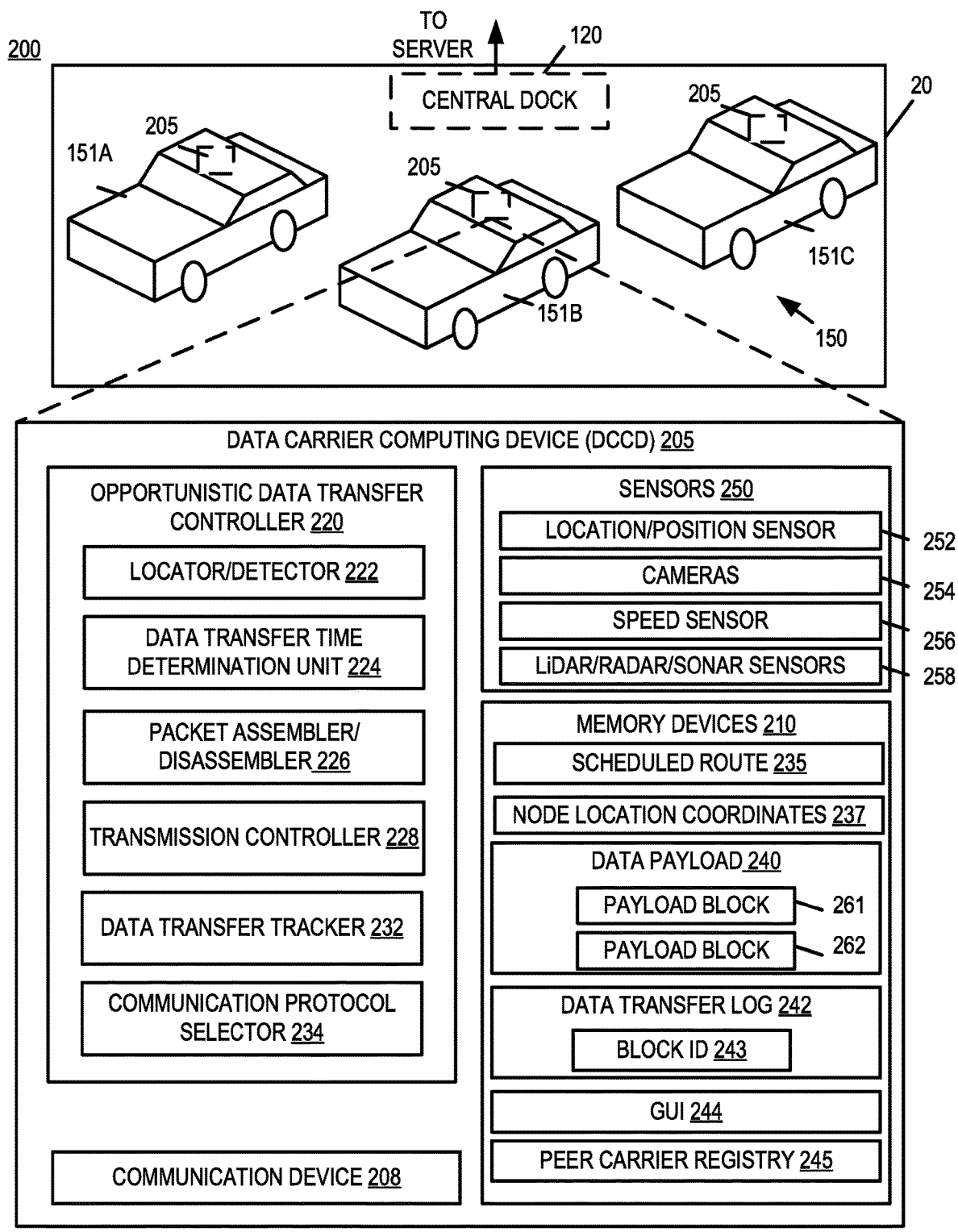
FIG. 2 is an example data carrier management system, in accordance with various embodiments of the present disclosure.

The system 100 may also download data from the smart node 101A, 101B to the data carrier devices 150 for transfer back to the server 110 using the central dock 120 (FIG. 2). The system 100 may have other communication pipelines, in some instances, to upload and download data. However, the opportunistic transfer of data whether uploading or downloading may be a backup mode of communications for any part of the system. The opportunistic transfer of data whether uploading or downloading may be a backup mode of communications such as when there is an interruption in Internet communication in some areas or a throughput overload of data.

FIG. 2 is an example data carrier management system 200, in accordance with various embodiments. The data carrier management system 200 may interface with the central dock 120 of system 100 installed at a location to service one or more data carrier devices 150. In this example, the central dock 120 is installed in a garage 20 or building where data carrier devices 150 (e.g., vehicles 151A, 151B and 151C) are serviced or parked when not in service and/or waiting to be rented. It should be understood that the central dock 120 may include multiple central docks 120 that are configured to communicate wired or wirelessly with data carrier devices 150 (i.e., vehicles 151A, 151B and 151C). In various embodiments, the central dock 120 may be dedicated for use by a fleet of data carrier devices 150, such buses, rental vehicles, taxis, or rental bicycles. The central docks 120 may be installed at bus stations as well. The central dock 120 may be installed at or integrated in charging/rental stations for bicycles, scooters or other mobile vehicles.

The central dock 120 may communicate with the server 110 using cellular communication, Internet communication, satellite communication, or other wireless or wired communication protocols. The central dock 120 may be in communication with one data carrier device 150 or a set of data carrier devices 150. For example, the central dock 120 may communicate with a data carrier device 150 with a short range communication protocol such as, by way of non-limiting example, Wi-Fi, ZIGBEE, BLUETOOTH, near field communications, infrared communications, Dedicated Short Range Communications (DSRC), or cellular vehicle-to-everything (C-V2X). In some instances, the data carrier device 150 may also be configured to communicate using long range communications such as using satellite communication protocols and infrastructure.

The data carrier management system 200 is depicted with a fleet of vehicles 151A, 151B and 151C. However, the description of FIG. 2 applies to all types of data carrier devices 150. While the system 200 illustrates wireless communications between the central dock 120 and the data carrier devices 150, the communication connection may be wired.

In various embodiments, the installation of the central dock 120 may be placed at gas stations, bus stations, electric charging stations, vehicle repair shops and garages or parking lots of rental companies, for example. By way of non-limiting example, the central dock 120 may also be placed at parking lots of shopping centers, shopping malls, retail stores, doctor's offices, hospitals, sports stadiums, schools, universities, museums, or other locations, to accommodate transfer of data to vehicles, buses, taxis, bicycles, or other data carrier devices.

The central dock 120 in some embodiments may not be required. The data carrier device 150 may include an electronic communication device such as without limitation, a smart phone, laptop or tablet. The data carrier device 150 may carry back any received node data for upload to the server 110 using the central dock 120 or other device providing Internet access, for example, for communications to the server 110.

A data carrier device 150 includes a data carrier computing device (DCCD) 205 that may include an opportunistic data transfer controller 220. The data carrier computing device 205 may be implemented using hardware, firmware, software or a combination of any of these. For instance, opportunistic data transfer controller 220 may be implemented as part of a microcontroller, processor, and/or graphics processing units. The DCCD 205 may include communication devices 208 and memory devices 210. The DCCD 205 may include one or more sensors 250. For the sake of brevity, the data carrier computing device 205 may include other hardware not disclosed herein.

The opportunistic data transfer controller 220 may communicate with communication devices 208 that may include or interface with a register and/or data store for storing data and programming instructions, which when executed, causes the communication devices 208 of the data carrier device 150 to receive a data payload 240 from the server 110 via the central dock 120 for one or more smart nodes 101A and 101B and store such data payload in memory devices 210 for subsequent opportunity transfer of data to one or more smart nodes 101A and 101B.

The opportunistic data transfer controller 220 may communicate with communication devices 208 that may include or interface with a register and/or data store for storing data and programming instructions which, when executed, cause the communication devices 208 of the data carrier device 150 to transmit a data payload 240 to the server 110 via the central dock 120 such as from the one or more smart nodes 101A and 101B. The opportunistic data transfer controller 220 may be configured to establish communications with the server 110 through the central dock 120 via the communication devices 208. In various embodiments, the data carrier device 150 may also transmit a data payload 240 to the server 110 via the central dock 120, such that the data payload 240 was from the one or more smart nodes but received through communications with a peer data carrier device.

In various embodiments, the opportunistic data transfer controller 220 may communicate its location and/or schedule to the server 110 via central dock 120 so that the data carrier device in some instances receives payloads that are for transfer to specific smart nodes that the data carrier device is expected to be communicatively in range of while traveling, based on past location data or schedule data. To do this, the data payload may include a header or other metadata with identifiers of the smart nodes for which the data is intended. Alternatively, the data transfer controller 220 may transfer to the data carrier device 150 indicia of a payload's designation smart node(s). In either case, the indicia may designate individual smart nodes or groups of smart nodes. When a data carrier device 150 then moves within communication range of any smart node (such as 101A), the smart node 101A may transmit a signal that includes the smart node's identifier and/or group. The data carrier device 150 may then analyze the metadata and/or associated indices of the payloads that it is carrying to determine whether any of the metadata and/or indices include an identifier matching that of the smart node 101A or its group. If a match exists, the data carrier device 150 may then transfer to the smart node 101A any portion of the payload that smart node 101A has not already received.

The one or more sensors 250 of the data carrier devices may include for example: a location/position sensor 252 such as an accelerometer, gyroscope, inertial measurement unit and/or global positioning system (GPS); and/or object detection sensors such as one or more cameras 254. The system may use the sensor data to determine the location of the data carrier device. For example, GPS data may identify the device's coordinates, and the system may access a map that includes coordinates and locations of roads, buildings and smart nodes to determine whether the device's coordinates are within a threshold distance from a smart node. The system also may analyze digital images captured by cameras, classify and identify objects in those images (such as buildings or road signs), and correlate those objects to map data to determine the vehicle's location within an area that is represented in the map. Additionally, the one or more sensors 250 in a vehicle may also include a speed sensor 256 and an odometer sensor (not shown). The one or more sensors 250 also may have a clock that the system architecture uses to determine vehicle time during operation. The clock may be encoded into the data carrier computing device 205, it may be a separate device, or multiple clocks may be available.

The one or more sensors 250 for vehicles may operate to gather information about the environment in which the vehicle or data carrier device is traveling. The one or more sensors 250 for vehicles may include, for example, a LiDAR sensor, a radar sensor and/or a sonar sensor 258. The one or more sensors 250 also may include environmental sensors such as a precipitation sensor and/or ambient temperature sensor. The one or more sensors 250 for autonomous vehicles may provide data used by the data carrier computing device 205 for determining at least one autonomous navigation operation and/or communication transfer. The object detection sensors may enable the vehicle to detect objects that are within a given distance or range of the vehicle in any direction, while the environmental sensors collect data about environmental conditions within the vehicle's area of travel. As should be understood, the one or more sensors 250 may be part of the vehicle but still necessary for autonomous control of the navigation of the vehicle. Additionally, it should be understood that the one or more sensors 250 may include additional sensors that are not disclosed herein. The vehicle may include other sensors (not shown) such as convenience sensors to equipping the vehicle with those convenience features to aid a human driver.

The opportunistic data transfer controller 220 may include a locator/detector 222 that is configured to receive a sensed signal from the location/position sensor 252 representative of the current location of the data carrier device 150 to locate a smart node, or peer data carrier device 150 relative to the current location. The locator/detector 222 may include or interface with a register and/or data store for storing data and programming instructions, which when executed, searches for an in-range smart node 101A, 101B and/or peer data carrier device 150 relative to the current location of the data carrier device. The smart node may be in a network 400 (FIG. 4) of smart nodes that is installed along a scheduled route 235 of the data carrier device stored in memory devices 210. The smart node 101A, 101B may be located based on a query of stored node location coordinates 237 within a communication range of the data carrier device 150 for its current location. A peer carrier registry 245 may be used to find registered peer data carrier devices with the same system 100, for example. In various embodiments, the data carrier device 150, when in-range of another peer data carrier device, may automatically detect the in-range peer data carrier device so that the registry 245 is populated to reflect the presence of the in-range peer data carrier device.

In some instances, the locator/detector 222 may detect a smart node by detecting communications transmitted by the smart node when the data carrier device 150 is in wireless communication range, such as by detecting a smart node identifier in the communication signal, in some embodiments. The locator/detector 222 may detect a peer data carrier device 150 by detecting communications transmitted by the peer data carrier device 150 when in wireless communication range.

The opportunistic data transfer controller 220 may include a data transfer time determination unit 224. The data transfer time determination unit 224 may include or interface with a register and/or data store for storing data and programming instructions, which when executed, determine a length of time the data carrier device 150 is in communication range with the smart node 101A, 101B, as the data carrier device 150 travels along a route. When determining a length of time, the data transfer time determination unit 224 may take into consideration a sensed signal by speed sensor 256 representative of the speed of the data carrier device 150. The length of time may be determined based on processing speeds for uploading and/or downloading by the communication devices 208, by the controller 220 and available communication bandwidth. The communication connection between the data carrier device 150 and the smart node 101A, 101B may be an ad hoc connection—that is, a short-lived connection via a near-field or short range communication connection protocol.

The data transfer time determination unit 224 may include or interface with a register and/or data store for storing data and programming instructions, which when executed, determine a length of time the data carrier device 150 is in communication with a peer data carrier device 150, as the data carrier device 150 travels along a route, based on speed of the vehicles, direction of motion, transfer speed, bandwidth, etc.

The opportunistic data transfer controller 220 may include a packet assembler/disassembler 226. The packet assembler/disassembler 226 may include or interface with a register and/or data store for storing data and programming instructions, which when executed, assemble one or more communication packages or packets each with a portion of the data payload for transmission during the determined length of time, to one of the smart node 101A, 101B or a peer data carrier device. The packet assembler/disassembler 226 may include or interface with a register and/or data store for storing data and programming instructions, which when executed, disassemble a received communication packet to extract the data payload being downloaded to the data carrier device. The packet includes designated fields which are parsed to extract the information content of the respective field, including block identifiers. The packet assembler/disassembler 226 may receive and be responsive to a control signal representative of the determined length of time from the data transfer time determination unit 224.

The opportunistic data transfer controller 220 may include a transmission controller 228. The transmission controller 228 may include or interface with a register and/or data store for storing data and programming instructions which, when executed, cause the communication device 208 to transmit, via a communication protocol, a communication package to the smart node 101A, 101B or a peer data carrier device 150, and cause the communication device 208 to receive, via a communication protocol, a communication package from the smart node 101A, 101B or peer data carrier device 150. For example, the communication protocol may require handshaking procedures and packets to identify the beginning of the transfer of data whether the transfer is an upload or download.

It should be understood, that any download to a peer data carrier device 150 may include data that is carried back for transfer to the server 110, transferred to one or more smart nodes, or other peer data carrier device. For example, the transfer to a peer data carrier device may be stored in memory devices 210 until it can be transferred to the server 110, a smart node or other peer data carrier device. The transmission controller 228 may transmit several packets with blocks of data. Each packet may include headers, an originator identifier, a destination identifier, payload character field, and other control fields compatible with various wireless communication protocols. In some instances, the transmission controller 228 may use set times based on routes or other activities to cause the opportunistic transfer of data.

The payload 240 may include data arranged in payload blocks, such as payload blocks 261, 262. The payload may include many blocks. Based on a determined length of time the data carrier device 150 has available to communicate before the ad hoc connection is lost, the smart node 101A, 101B may receive a portion (i.e., block 261 and/or block 262) of the data payload 240.

Likewise, for peer-to-peer communications, based on a length of time the first data carrier device (such as vehicle 151A) has available to communicate with a second data carrier device (such as vehicle 151B), the peer data carrier device may receive a portion (i.e., block 261 and/or block 262) or a different portion of block of the data payload. It should be understood that the data payload 240 includes data that may need to be uploaded to a smart node, for example, whether it is directly to the smart node or using another peer data carrier device.

The opportunistic data transfer controller 220 may be configured to determine that the smart node 101A or smart node 101B is present along the route, determine an amount of data that the vehicle 151A, 151B or 151C has available for the smart node, and use a speed of travel of the vehicle 151A, 151B or 151C and map data (route data) to determine a length of time the data carrier device 150 within which the vehicle will be in communication range of the smart node. This system may calculate the time using a simple algorithm (such as by determining a vehicle's anticipated speed and planned path, measuring the distance within the planned path that includes the communication range, and dividing that distance by the vehicle's speed). However, in most situations a more complex formula would be used since the vehicle's speed will not remain constant as the vehicle moves along the planned path. If the determined time is sufficient to transfer the amount of the data to the smart node, the opportunistic data transfer controller 220 may transfer the image data and the other sensed data to the smart node via a communication link, otherwise it may not transfer the data to the smart node, or it may transfer only a portion of the data to the smart node. The data may be software and/or data updates for the smart node, image data or other sensed data captured by the data carrier device, or both, and such data may also be referred to as a data payload.

The opportunistic data transfer controller 220 may be configured to determine that a peer data carrier device is present along the route, determine an amount of the data that is available to transfer, and use a speed of travel of the vehicle 151A, 151B or 151C and map data to determine a length of time within which the vehicle will be within communication range of the peer data carrier device. The system may do this via calculations such as those described above. However, if the determined length of time is sufficient to transfer the amount of the image data and the other sensed data to the peer data carrier device, the vehicle 151A, 151B or 151C may transfer the image data and the other sensed data to the (in-range) peer data carrier device via a peer-to-peer communication link, otherwise it may not transfer the image data and the other sensed data to the peer data carrier device. The vehicle 151A, 151B or 151C may determine that a portion of the payload may be sent to the (in-range) peer data carrier device.

The opportunistic data transfer controller 220 may include a data transfer tracker 232 that is configured to log the completed opportunistic transfer of blocks in a data transfer log 242. The opportunistic transfer of blocks may include uploaded data and/or downloaded data. The data transfer tracker 232 may include or interface with a register and/or data store for storing data and programming instructions, which when executed: determine which blocks of data were successfully transferred to or from the smart node and log the completion of data transfer into the data transfer log 242; and determine which blocks of data were successfully transferred to or from the peer data carrier device 150 and log the completion of data transfer into the data transfer log 242. The data transfer tracker 232 may include or interface with a register and/or data store for storing data and programming instructions, which when executed: determine which blocks of data were unsuccessfully transferred to or from the smart node and log the unsuccessful or missing data transfer into the log 242; and determine which blocks of data were unsuccessfully transferred to or from the peer data carrier device 150 and log the unsuccessful or missing data transfer into the data transfer log 242. The data transfer tracker 232 may be interfaced with the communication devices 208 to receive a signal representative of successful transmission or unsuccessful transmission.

The data transfer tracker 232 may include or interface with a register and/or data store for storing data and programming instructions, which when executed, receive data from a smart node indicative of which blocks of data have been successfully transferred to the smart node 101A, 101B by other data carrier devices and log the completion of data transfer into the data transfer log 242. In some embodiments, the smart node 101A, 101B may indicate the next block needed. For example, if the data carrier device 150 receives an indication from the smart node that the smart node has received first three blocks, the data carrier device 150 may begin communicating the fourth block and any remaining blocks in the data payload 240, if available.

The data carrier devices 150 (e.g., vehicles 151A, 151B, 151C), the smart nodes 101A, 101B, or both may include a data transfer tracker 232 that may also be configured to log block identifiers 243 of the completed uploaded blocks in an data transfer log 242 sent by other data carrier devices. This may be part of a handshaking procedure between a communicating device and smart nodes. The data transfer log 242 may log block identifiers 243, so that missing block identifiers may be determined. If the blocks have a sequential order, than the smart node, the vehicle, or both may know which block identifiers have been transferred and which are missing or remaining. The tracked block identifiers 243 may be helpful for data carrier devices which travel the same route traveled by other peer data carrier devices. If a data carrier device approaches a smart node which has already received all the blocks of the payload, then opportunistic transfer of data is not necessary.

The opportunistic data transfer controller 220 may include a communication protocol selector 234 that is configured to select a communication protocol, such as for creating an ad hoc connection, short range connection, or for peer-to-peer communications. The communication protocol selector 234 may include or interface with a register and/or data store for storing data and programming instructions, which when executed, determine which communication protocol to use for the wireless connection with a smart node 101A, 101B or peer data carrier device 150. In some embodiments, a peer data carrier device 150 may include unlimited data service from the mobile or cellular carrier. The peer data carrier device 150 may include a personal hotspot for peer-to-peer communications using a Wi-Fi protocol, for example. In an example, the transfer of data between peer data carrier devices may use a BLUETOOTH protocol.

Some of the data carrier devices 150 may operate autonomously to transfer data. In various embodiments, the data carrier computing device 205 may include a graphical user interface (GUI) 244 which allows a user to selectively operate in the system 100. For example, a user may selectively turn off the ability to participate in transferring data to smart nodes using the graphical user interface 244. In various embodiments, the graphical user interface 244 may display which blocks have been received and which blocks remain outstanding or incomplete. In various embodiments, the graphical user interface may allow users to select or connect with in-range peer data carrier devices 150.

An example smart node will be described in relation to FIGS. 3A-3B.

Figure 3A:
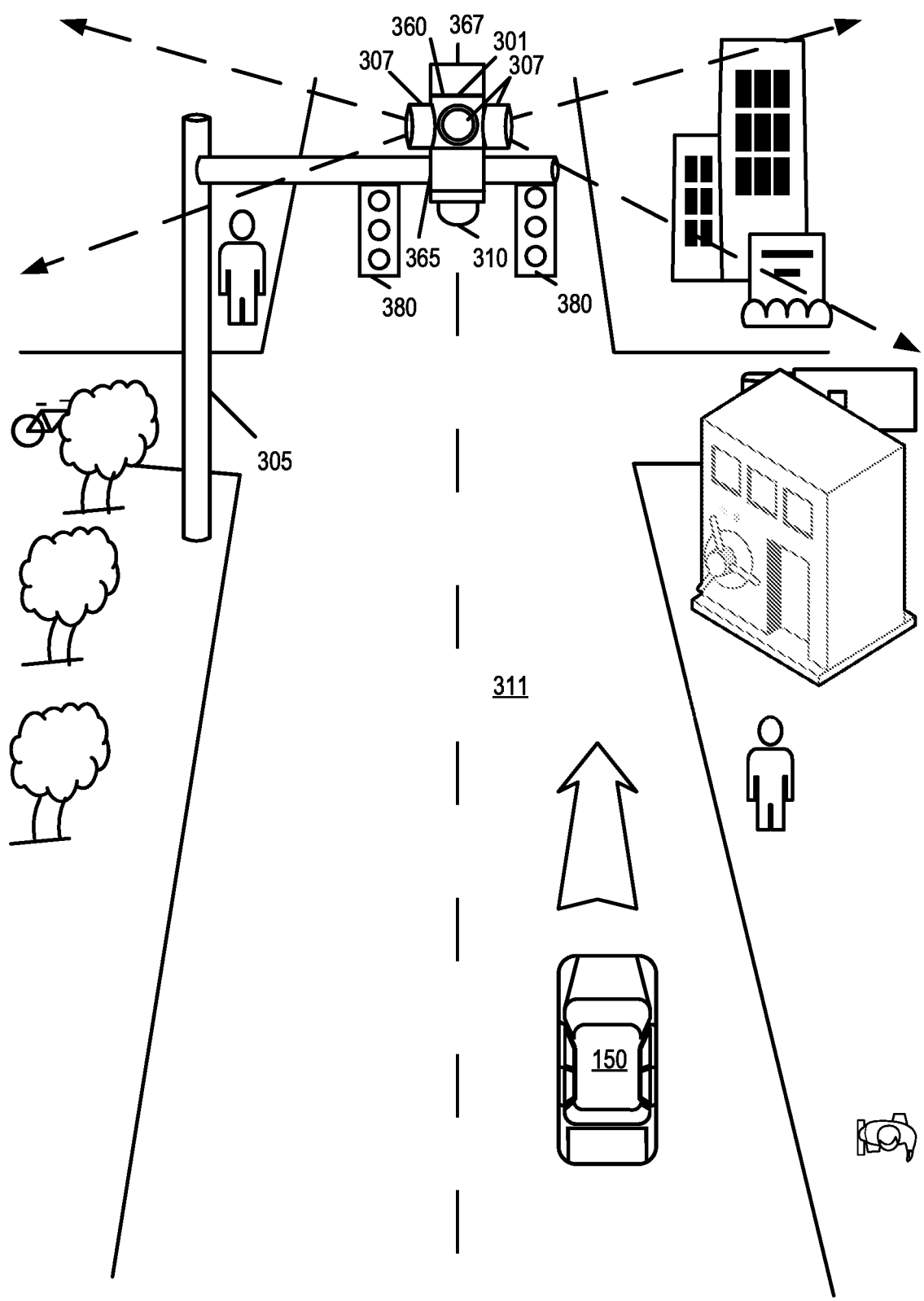
FIG. 3A is an example smart node installed on a traffic light gantry and an environment.
Figure 3B:
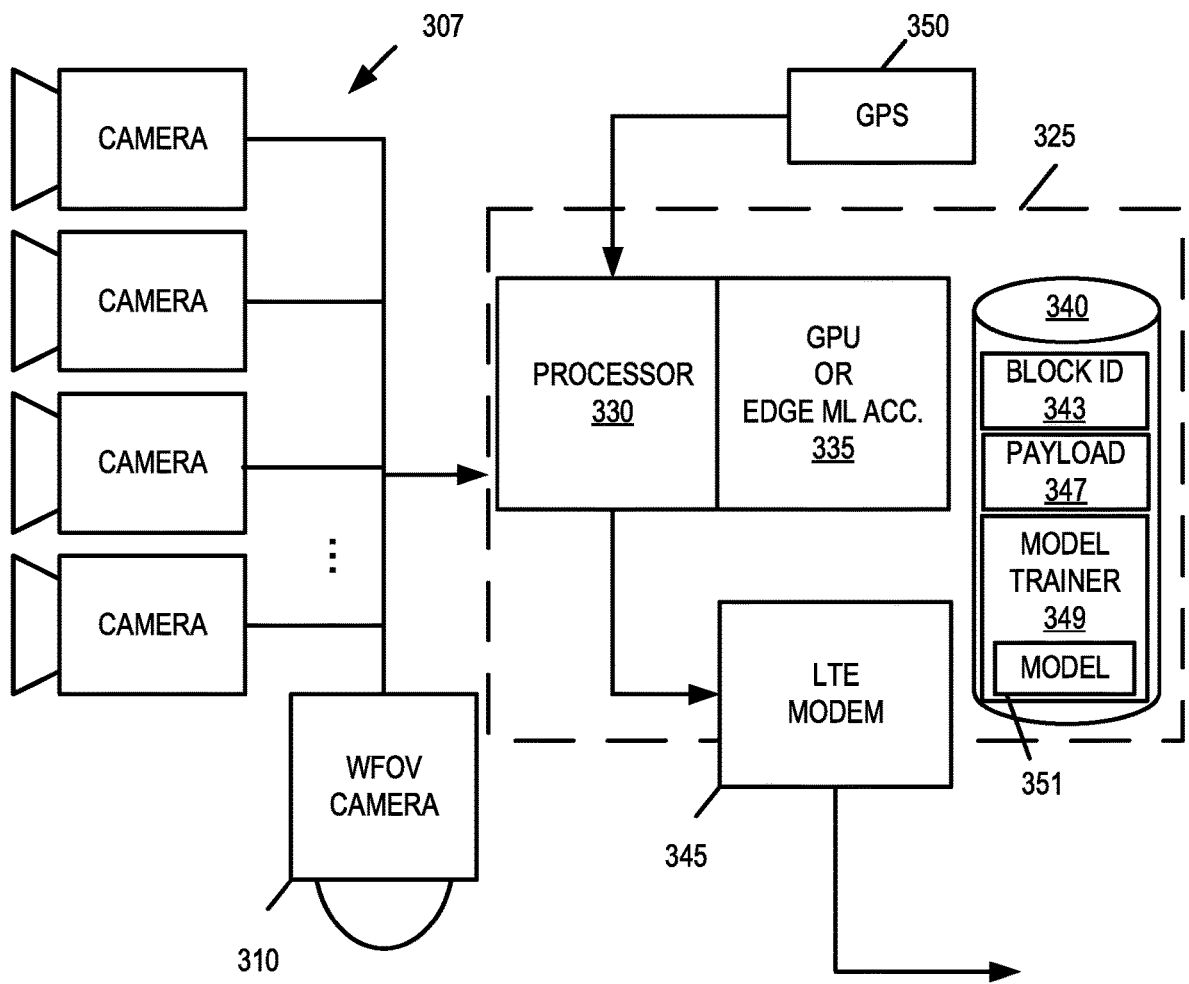
FIG. 3B is an example block diagram of a smart node.

FIG. 3A illustrates an example smart node 301 installed on a gantry of a traffic light pole 305. An example block diagram of the smart node 301 is shown in FIG. 3B. The smart node 301 may include at least one node housing 360 to house one or more cameras (such as first, narrow field of view (FOV) cameras 307 and a second, wide FOV camera 310 (in which the terms "narrow" and "wide" are intended to be qualifiers that compare the cameras' fields of view relative to each other)), node controller 325 and a communication device 345 (e.g., LTE modem and/or communication unit).

The smart node 301 may include at least one node mount assembly 365 to attach the at least one node housing 360 to a gantry of a traffic light pole with at least one traffic light device 380. The at least one node mount assembly 365 may include clamps, fasteners, brackets, and/or straps. The at least one node housing 360 may include a camera housing for housing and mounting the cameras 307 and camera 310. The node controller 325 may include a graphics processing unit (GPU) 335 configured to process the images or video streams from the narrow FOV cameras 307 and the wide FOV camera 310. The node controller 325 may include a local storage device 340 configured to store the captured images of the multiple FOVs and store programming instructions for carrying out the functions of the smart node 301 described herein, including image processing, feature or object extraction, location determination, speed of a moving object or vehicle, and direction of movement of a moving object or vehicle, for example. The smart node 301 may include a global positioning system (GPS) 350 or have fixed location coordinates stored in memory of the local storage device 340.

The smart node 301 may include a separate housing 367, such as a smart node controller housing, for housing the node controller 325 including a processor 330, a local storage device 340 and the communication devices 345. Nonetheless, the at least one node housing 360 may integrate one or more housings into a single housing assembly for mounting to the gantry of a traffic light pole. The depicted arrangement of the housings 360 and 367 is for illustrative purposes and not meant to be limiting in any way. Additional details of smart nodes and how they operate are disclosed in U.S. patent application Ser. No. 16/928,844, titled "Smart Node for Autonomous Vehicle Perception Augmentation", the disclosure of which is fully incorporated into this document by reference.

The smart node 301 uses advanced processing capabilities, such as machine learning, feature extraction algorithms, instead of relying on off-board capabilities. The smart node 301 may classify objects, such as moving objects, in the environment. However, from time to time the smart node 301 needs to have its software updated, such as for processing efficiency, update functionality, security updates, data analytics, machine learning algorithms, etc.

In some embodiments, the smart node 301 may transfer traffic infrastructure data (i.e., the data that smart node infrastructure cameras and other sensors collect) to the data carrier device 150 (e.g., vehicle) for transfer to another smart node or the server 110. This may provide an alternate channel of communication if communication with another smart node is not available.

The smart node 301 may identify which blocks of data have been successfully received to an in-range data carrier device 150 so that the data carrier device may start the transfer by sending packets with those blocks identified as incomplete or missing. The local storage device 340 may store and track in memory the block identifiers 343 of received blocks of a data payload 240. The smart node 301 may store its own data payload 347 to be transferred to other smart nodes or the server 110 via a data carrier device 150. Thus, the data payload 240 from a server 110, other smart nodes or peer data carrier devices may be divided into portions so that the blocks may be transferred from disparate data carrier devices which do not have knowledge of each other.

As discussed previously, the data payload 240 may include training data. The smart node 301 may be used by a model trainer 349 configured to train a model 351 used by the smart node in the system. The model 351 may be used in machine learning. The training data may include, without limitation, programming instructions to retrain an existing model and create a new model. The training data may include training data sets for use by the model and may include labeled or unlabeled image data.

The description herein provides opportunistic transfer of data between a data carrier device and a smart node. This allows smart infrastructure providers to more inexpensively gather and offload data to and from their systems, which is useful for improving the quality and performance of the deployed smart infrastructure system. Moreover, the opportunistic transfer of data between a data carrier device and a smart node may be used to train and retrain the smart node in the field to improve and/or update the machine learning capability of the smart node even when normal communication links are blocked.

In various embodiments, the opportunistic data transfer may include an instantaneous connection, which results in an amount of data transferred based on an ad hoc connection cost, duration, and available bandwidth. Since all of these devices would be able to connect to each other, they would know the connection cost, duration, and available bandwidth ahead of time and could optimally plan for when data could be transferred, such as along a planned route. Lastly, the ad hoc connection may be both ephemeral and point-to-point, which may be easier to secure and in and of itself may offer extra security in that the network is not always accessible. A data carrier device may plan when to transfer data along a planned route when the cost of transmission is lower. For example, a communication service provider may charge more for data transfers during prime time hours such as when network usage is high. A communication service provider may charge less for data transfers during times network usage is low. Accordingly, a data carrier device may plan to transfer data when costs are lower.

Figure 4:
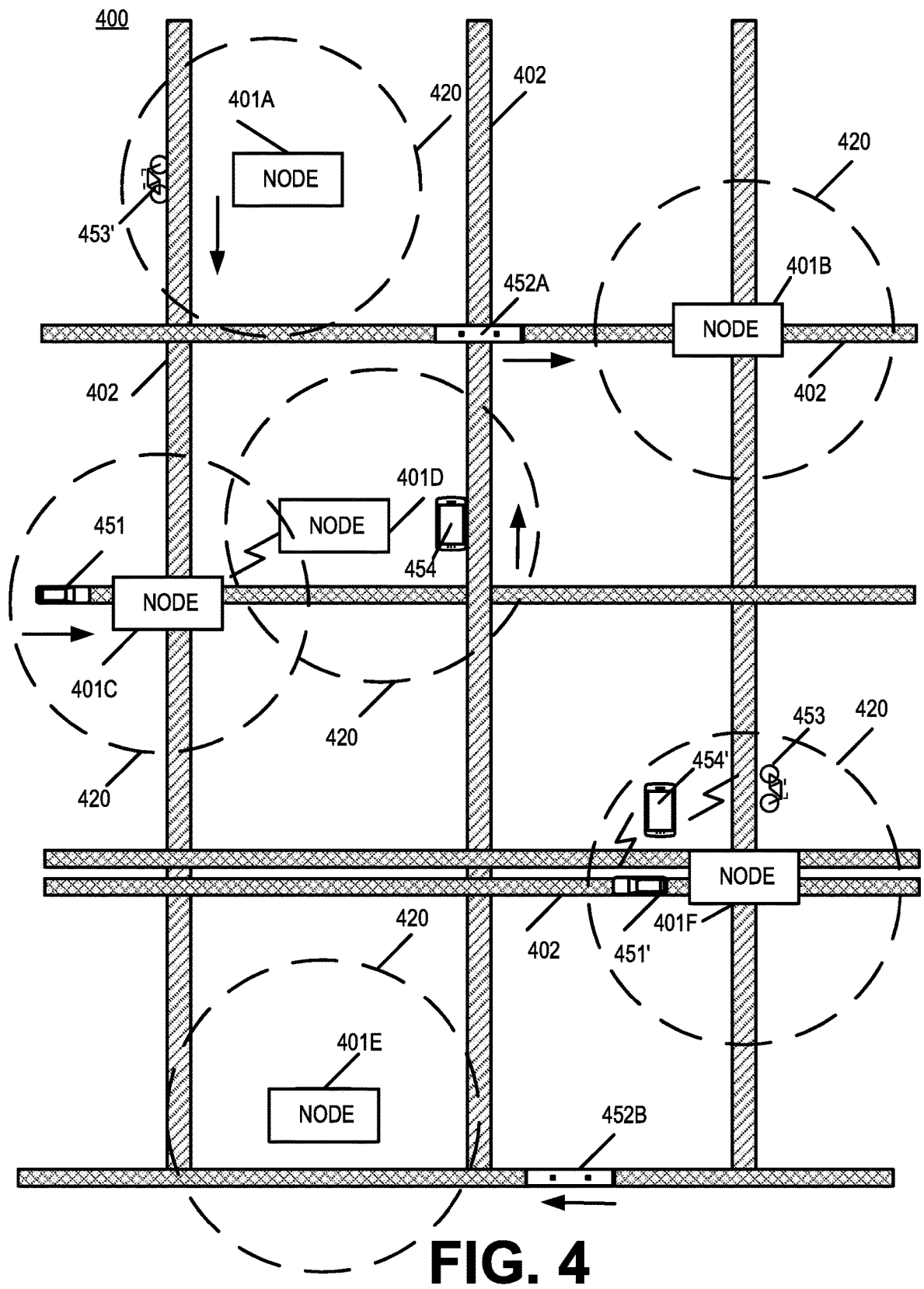
FIG. 4 illustrates a network of smart nodes for use in the system of FIG. 1.

FIG. 4 illustrates a network 400 of smart nodes for use in the system of FIG. 1. The network 400 includes smart nodes 401A, 401B, 401C, 401D, 401E and 401F that are placed along various road 402 or paths. Some smart nodes 401B, 401C, and 401F may be located at intersections. Each smart node has a communication range 420. The communication range 420 may vary based on immediately surrounding structures around the smart node. FIG. 4 also illustrates various data carrier devices, such as vehicle 451, buses 452A and 452B, bicycle 453 and mobile smart phone 454. The data carrier devices, such as vehicle 451, buses 452A and 452B, bicycle 453 and mobile smart phone 454 may each be a peer data carrier device to one or more of the other data carrier devices.

To prevent crowding of FIG. 4, some of the data carrier devices and nodes have been omitted. As can be seen, opportunistic transfer of data by a data carrier device can take place simultaneously or at different times. Vehicles, buses, and bicycles traveling along the same road may also have peer-to-peer communications with other data carrier devices for the transfer of traffic control data from one data carrier device to another data carrier device. The smart nodes may monitor traffic along a route such as for city planning, traffic control, and traffic congestion remediation.

Various scenarios will now be described using the illustration of FIG. 4. The data carrier device, such as smart phone 454 may also be denoted by the reference numeral 454' to denote travel of the smart phone 454 to a second node location. Likewise, other data carrier devices may use the same nomenclature to denote that the data carrier device has moved to a second node location.

In a first scenario, assume that the smart phone 454 received a payload from smart node 401D, when in communication range, that is intended for one or more other smart nodes (i.e., smart node 401F). Accordingly, the smart phone 454 may upload the node's data payload from smart node 401D and subsequently transfer this node's data payload to the smart node 401F, when smart phone 454' in communication range.

In a second scenario, assume that vehicle 451 received a payload from server 110 for several smart nodes in the network 400. Therefore, as vehicle 451 travels in the city it can transfer the server's payload or portions of the payload to one or more of the smart nodes, when the vehicle is in communication range with those smart nodes. In this scenario, vehicle 451 is able to transfer the payload or portions thereof to node 401C and node 401F, for example. However, the vehicle 451 may transfer the payload or portions from the server 110 to the mobile smart phone 454'. This is because both the vehicle 451' and mobile smart phone 454' may be in range of each other when both are in proximity to smart node 401F, in this example. Subsequently, the mobile smart phone 454' would transfer the received server's payload from vehicle 451' to smart node 401D, when the mobile smart phone 454 is back in communication range of smart node 401D. Moreover, vehicle 451' with the server's payload may transfer the payload or portions to the bicycle 453. Accordingly, the bicycle 453 would transfer the received server's payload to smart node 401A, when the bicycle 453' in communication range.

In a third scenario, the buses 452A and 452B may follow scheduled routes for example. The route of one bus (i.e., bus 452A) may overlap the route of the other bus 452B. Thus, bus 452A would transfer a payload or portion to node 401B while bus 452B would transfer the payload or portion to node 401E. Assume also that buses 452A and 452B are peer data carrier devices to each other or other data carrier devices. Then, bus 452A may transfer any node data it has received from node 401B to bus 452B for subsequent transfer by bus 452B to node 401E or any other node that bus 452B would be in communication range. For example, node payloads from a particular smart node may not be needed by all other smart nodes, but select smart nodes. Likewise, server payloads may be specific to one or a group of smart nodes but not all smart nodes. It should be understood, that to describe each and every scenario is prohibitive. While this example discusses buses that travel scheduled routes, embodiments include vehicle that may occasionally repeat route segments on no particular schedule, such as is the case with taxis, or with vehicles that are part of a fleet (such as a government-owned fleet of vehicles).

In various embodiments, one or more smart nodes may be able to communicate directly with each other. For example, the smart nodes 401C and 401D are illustrated with overlapping communication ranges 420. Therefore, the smart nodes 401C and 401D may communicate any data payload received from any of the data carrier devices between each other. Furthermore, a node's data payload from smart node 401C may be directly send to smart node 401D. Likewise, a node's data payload from smart node 401D may be directly send to smart node 401C.

In a fourth scenario, assume that smart node 401D is on a cross road while smart node 401C is on a main road. Any data payloads received by smart node 401C may be directly sent to the smart node 401D.

Figure 5:
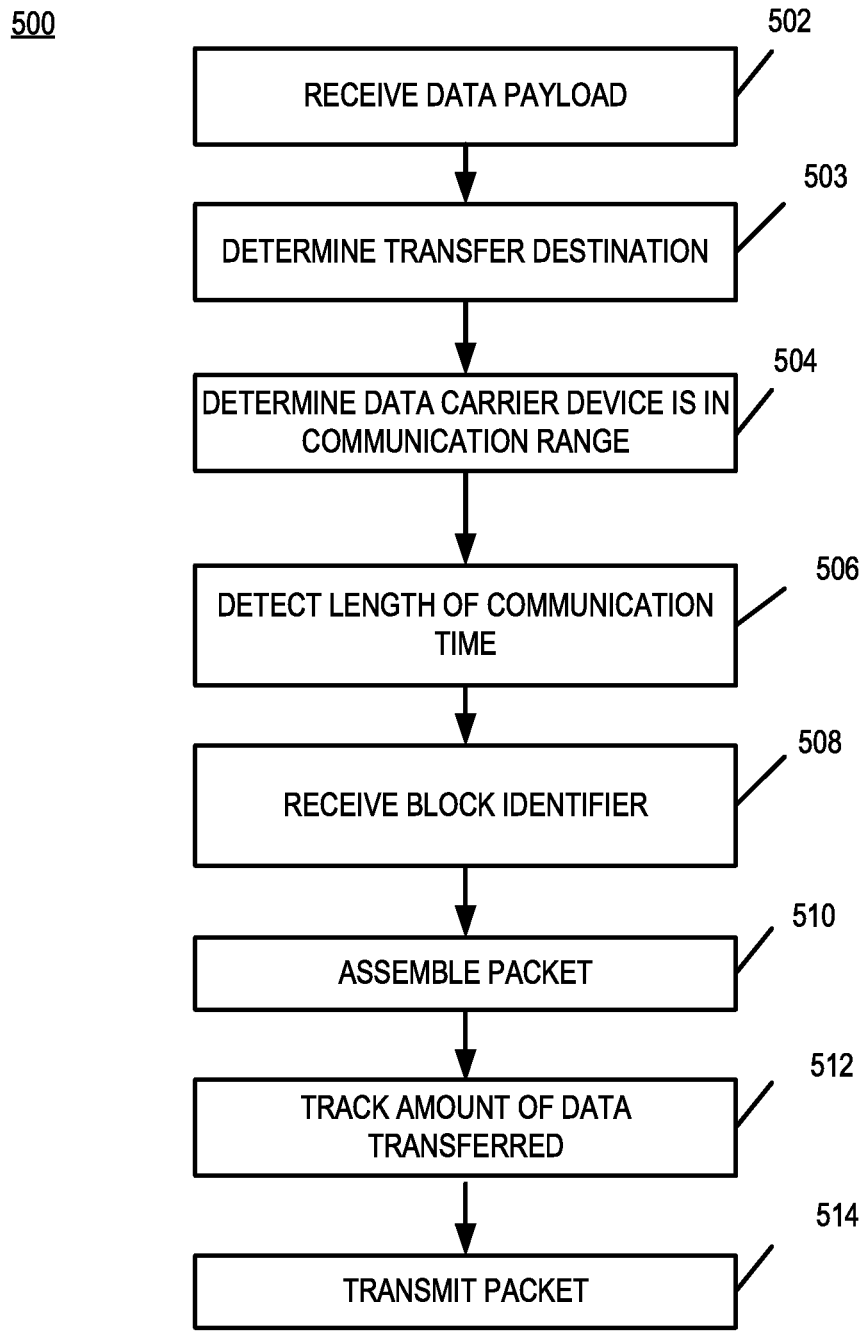
FIG. 5 is an example flowchart of a method for transferring data between a data carrier device and a traffic control infrastructure system, in accordance with various embodiments of the present disclosure.

FIG. 5 is an example flowchart of a method 500 for transferring data between a data carrier device 150 and a traffic control infrastructure system. The method blocks may be performed in the order shown, a different order or contemporaneously. One or more of the blocks may be omitted. Blocks may be added or deleted. The method 500 will be described in relation to FIGS. 1-2, 3A-3B and 4.

The method 500 may include receiving by a communication device 208 (FIG. 2) of the data carrier device 150, a data payload (at 502) for a smart traffic control infrastructure node 101A, 101B on a route. The data payload may be received from the remote server 110, a smart node 101A, 101B in the system 100, or a peer data carrier device. The communication device 208 (FIG. 2) may be configured to establish one of: (a) a communication connection to a remote server 110 of the system 100, (b) a communication connection accessible by a first short range communications protocol to a peer data carrier device that are traveling along a route, or (c) a communication connection accessible by a second short range communications protocol to another smart node 101A, 101B. The communication connection to the remote server 110 may use a first communication protocol, the communication connection to the peer data carrier device may use a second communication protocol, and the communication connection to another smart node may use a third communication protocol. The first, second and third communication protocols may be the same or different protocols. The second communication protocol may be a peer-to-peer communication protocol, an ad hoc communication protocol or short range communication protocol. The third communication protocol may be an ad hoc communication protocol or short range communication protocol. It should be understood, that the data payload may originate from the server or from a smart node.

The method 500 may include, after receiving a data payload, the computing device by the computing device 205 may determine a transfer destination for transfer of the received data payload (at 503). The server's data payload may indicate which transfer destinations (i.e., smart nodes) that need to receive the server's data payload in network 400, for example. The node's data payload may also indicate which other smart nodes of the network 400 (FIG. 4) should receive the node's data payload. A data payload from any peer data carrier device would also indicate a transfer destination (i.e., smart node or server) for any data transferred between peer data carrier devices that is intended for a smart node or server.

The method 500 may include, by the computing device 205 (FIG. 2) of the data carrier device 150, detecting that the data carrier device is within a communication range of the smart node 101A, 101B (at 504). In some embodiments, the computing device of the data carrier device 150 may detect that the data carrier device is in range of a peer data carrier device or both a smart node and peer data carrier device. In various embodiments, the data carrier device 150 may detect that the data carrier device is within a communication range of the central dock 120 (FIG. 2) or other communication service provider for the data carrier device.

The computing device 205, upon detecting that the data carrier device is within the communication range of the smart node, may determine a length of communication time (at 506) that the data carrier device 150 will be in communication with the smart node 101A, 101B, as the data carrier device travels along the route. The computing device 205 may be configured to generate a control signal representative of a determined length of time that the data carrier device will be in communication with the smart node, in response to the data carrier device being in communication range of the smart node. The packet assembler/disassembler 226 may be configured to receive the control signal. In other embodiments, when the data carrier device in in range of a peer data carrier device, the computing device 205 may be configured to also generate a control signal representative of a determined length of time that the data carrier device will be in communication with the peer data carrier device. In other embodiments, when the data carrier device in in range of the remote server 110, the computing device 205 may be configured to also generate a control signal representative of a determined length of time that the data carrier device will be in communication with the remote server 110.

The method 500 may include, by the computing device 205, assembling a communication package with a portion of the data payload for transmission during the determined length of time (at 510). In some embodiments, the communication of the data payload or portion is for a peer data carrier device. Accordingly, the package would be assembled for peer-to-peer communications with a peer data carrier device. Likewise, the computing device 205 may be configured to assemble a communication package with a portion of the data payload for transmission during the determined length of time (at 510) to a central dock 120 (FIG. 2) or remote server 110.

The packet assembler/disassembler 226 may be configured to assemble, based on the generated peer control signal, a communication package with at least a portion of one of: i) a data payload received from a peer data carrier device; ii) a data payload received from another smart node; or iii) a data payload from the remote server.

In response to the packet assembler/disassembler 226 assembling a communication package, the data transfer tracker 232 may track an amount of data of the data payload (at 512) transferred to the smart node or peer data carrier device, for example, per the communication package.

The method 500 may include, transmitting, by the communication device 208 (FIG. 2), the assembled communication package to the smart node for the determined length of time (at 514). On the other hand, if the communication package is for a peer data carrier device, the communication device 208 will send the communication package to the peer data carrier device. The communication device 208 may be configured to transmit during a peer-to-peer communication session with the peer data carrier device a communication package. In some embodiments, the transmitting by the communication device 208 may include transmitting the communication package to the remote server 110 via the central dock 120. The communication package may include a node's data payload or a peer's data payload.

Assume that the data payload is a received node's data payload. Accordingly, in response to the determined transfer destination (at 503), the communication device 208 may be configured to perform: (i) connecting to the remote server 110 to transfer the received node's data payload, in response to the determined transfer destination being the remote server; (ii) connecting to another smart node to transfer the received node's data payload, in response to the determined transfer destination being the another smart node; and/or (iii) connecting to the peer data carrier device to transfer the received node's data payload, in response to the determined transfer destination being the peer data carrier device.

As should be understood, that once the smart node receives the communication package, the data payload 240 or portion is extracted by the node's processor. The node's memory (i.e., logical storage device 340) or software may be updated with the received portion of the data payload in the communication package. The node's processor would track a block identifier 343 associated with the received portion of the data payload 240. In operation, the smart node may retrieve and communicate block identifiers 343 (at 508) that may represent an amount of data or blocks already successfully received. In some embodiments, a block identifier 343 may indicate a missing block or outstanding block, for example. The assembled packet (at 510) created by the packet assembler/disassembler 226 may select a different portion of the data payload for assembly in the packet (i.e., communication package) which has not already been received by the smart node. The packet assembler/dissembler 226 may be configured to select the different portion, in response to the received block identifier 343 or a block identifier 243 tracked by the data carrier device.

It should be understood, that the data carrier device may travel a route on a schedule. The scheduled route 235 (FIG. 2) may require the data carrier device to repeat a route portion of the route along which the smart node is located. Accordingly, a first portion of the data payload may have been sent to the smart node when it was passed by the data carrier device a first time, for example. Upon subsequent return to the route portion and re-establishing communication with the smart node, the data carrier device may determine whether the entire portion of the payload was transferred or whether any portions remain to be transferred. If any portions remain, the data carrier device may send a second portion of the data payload to the smart node upon subsequent return to the route portion, according to the schedule. The data payload may include multiple portions which can be received by one data carrier device or multiple data carrier devices. As should be understood, the data carrier device would be responsive to a second control signal representative of a second (subsequent) length of time the vehicle will be in the communication range with the smart node, as the vehicle travels along the repeated route portion of the route The disclosed embodiments allows a data transfer in a smart infrastructure system to be planned based on an upfront hardware design and cost perspective, as well as, a recurring cost perspective.

Terminology that is relevant to the disclosure provided above is described below.

The term "vehicle" refers to any moving form of conveyance that is capable of carrying either one or more human occupants and/or cargo and is powered by any form of energy. The term "vehicle" includes, but is not limited to, cars, trucks, vans, buses, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and control operation of the vehicle.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, kiosks, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility," "local storage device" and the like each refer to a non-transitory device on which computer-readable data, programming instructions or both are stored. Except where specifically stated otherwise, the terms "memory," "memory device," "data store," "data storage facility," "local storage device," and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, "electronic communication" or "communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

A "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of transferring data between an autonomous vehicle and a vehicle traffic control infrastructure system, the method comprising:
  receiving, by a communication device of a vehicle, a data payload for a smart traffic control infrastructure node;
  by a computing device of the vehicle:
    determining that the vehicle is or will be within a communication range of the smart traffic control infrastructure node,
    determining a length of time that the vehicle will be in the communication range of the smart traffic control infrastructure node, and
    assembling a first communication package with at least a portion of the data payload that can be transferred in the determined length of time;
  by a communication device of the vehicle when the vehicle has an ad hoc communication link with the smart traffic control infrastructure node, transmitting the first communication package to the smart traffic control infrastructure node$_i$
  by the computing device of the vehicle:
    detecting that a peer data carrier device is within the communication range of the vehicle, determining a second length of time that the peer data carrier device will be in communication with the vehicle, and assembling a second communication package with at least a second portion of the data payload that can be transmitted to the peer data carrier device during the determined second length of time; and by the communication device of the vehicle, engaging in a peer-to-peer communication session with the peer data carrier device and transferring the second communication package to the peer data carrier device during the session.

2. The method of claim 1, wherein receiving the data payload comprises doing so from one of the following:

a remote server;

the peer data carrier device; or another smart traffic control infrastructure node.

3. The method of claim 1, further comprising, by the smart traffic control infrastructure node:

receiving, by a communication device of the smart traffic control infrastructure node, the first communication package;

updating, by a processor of the smart traffic control infrastructure node, memory or software of the smart node with the received portion of the data payload in the first communication package; and tracking, by the processor of the smart traffic control infrastructure node, an identifier associated with the received portion of the data payload.

4. The method of claim 3, wherein:

the vehicle travels a route;

the route includes repeating a route portion of the route along which the smart traffic control infrastructure node is located; and the method further comprises:

by the computing device of the vehicle, while the vehicle is repeating the route portion of the route:

detecting that the vehicle is within the communication range of the smart traffic control infrastructure node, determining that the data payload includes a second portion that was not transmitted to the smart traffic control infrastructure node in the assembled first communication package, and assembling a third communication package with the second portion of the data payload for transmission; and by the communication device of the vehicle, transmitting the third communication package with the second portion of the data payload to the smart traffic control infrastructure node while the vehicle is repeating the route portion and within the communication range of the smart traffic control infrastructure node.

5. The method of claim 4, further comprising:

by the smart traffic control infrastructure node:

detecting that the vehicle is within the communication range of the smart traffic control infrastructure node while repeating the route portion, and upon detecting that the vehicle is within the communication range of the smart traffic control infrastructure node while repeating the route portion, retrieving an identifier representative of an amount of previously received data of the payload; and transmitting, by the communication device of the smart traffic control infrastructure node, the retrieved identifier to the communication device of the vehicle.

6. The method of claim 1, further comprising:

receiving, by the communication device of the vehicle, a node's data payload from the smart traffic control infrastructure node;

determining, by the computing device of the vehicle, a transfer destination for transfer of the node's data payload; and by the communication device of the vehicle, performing one or more of the following:

(i) connecting to a remote server to transfer the node's data payload, in response to the determined transfer destination being the remote server, (ii) connecting to another smart node to transfer the node's data payload, in response to the determined transfer destination being the another smart node; or (iii) connecting to the peer data carrier device to transfer the node's data payload, in response to the determined transfer destination being the peer data carrier device.

7. The method of claim 1, further comprising:

by the communication device of the vehicle, communicatively connecting to a central dock; and wherein receiving the data payload comprises receiving the data payload from a server via the central dock.

8. The method of claim 1, further comprising:

by the computing device of the peer data carrier device:

determining that the peer data carrier device is or will be within a communication range of the smart traffic control infrastructure node, determining a length of time that the peer data carrier device will be in communication with the smart traffic control infrastructure node, and assembling a third communication package with at least a portion of the data payload received from the vehicle; and by a communication device of the peer data carrier device, while the peer data carrier device is within the communication range of the smart traffic control infrastructure node, transmitting the third communication package to the smart traffic control infrastructure node for the determined length of time.

9. The method of claim 1, wherein the data payload comprises at least one of the following:

a software update for the smart traffic control infrastructure node; or training data for the smart traffic control infrastructure node to train a model used in machine learning.

10. A vehicle comprising:

a sensor configured to sense a location along a route;

a processor;

a communication device; and a computer readable medium having programming instructions that, when executed, will cause the processor to:

receive a data payload for a smart traffic control infrastructure node, during a run of the vehicle, determine when the vehicle is or will be within communication range of the smart traffic control infrastructure node, determine a length of time that the vehicle will be in a communication range of the smart traffic control infrastructure node, assemble a first communication package with at least a portion of the data payload, while the vehicle has an ad hoc communication link with the smart traffic control infrastructure node, cause the communication device to transmit the first communication package to the smart traffic control infrastructure node,
detect that a peer data carrier device is within the communication range of the vehicle,
determine a second length of time that the peer data carrier device will be in communication with the vehicle,
assemble a second communication package with at least a second portion of the data payload that can be transmitted to the peer data carrier device during the determined second length of time, and
cause the communication device of the vehicle to engage in a peer-to-peer communication session with the peer data carrier device and transfer the second communication package to the peer data carrier device during the session.

11. The vehicle of claim 10, wherein the programming instructions are further configured to cause the processor to:
track an amount of data of the data payload transferred to the smart traffic control infrastructure node.

12. The vehicle of claim 11, wherein the programming instructions are further configured to cause the processor to:
while the vehicle is repeating a portion of the route that is within communication range of the smart traffic control infrastructure node:
detect that the vehicle is again within the communication range of the smart traffic control infrastructure node,
determine that the data payload includes a second portion that was not transmitted to the smart traffic control infrastructure node in the first communication package,
assemble a third communication package with the second portion of the data payload for transmission; and
cause the communication device to transmit the third communication package with the second portion of the data payload to the smart traffic control infrastructure node while the vehicle is repeating the portion of the route that is within the communication range of the smart traffic control infrastructure node.

13. The vehicle of claim 10, further comprising additional programming instructions that are configured to cause the processor to:
detect that the communication device has received a node's data payload from the smart traffic control infrastructure node;
determine a transfer destination for the node's data payload, wherein the transfer destination comprises one or more of the following:
(i) a remote server,
(ii) another smart node, or
(iii) the peer data carrier device; and
upon detecting that the communication device has communicatively connected to the transfer destination, cause the communication device to transfer the node's data payload to the transfer destination.

14. The vehicle of claim 10, wherein:
the communication device is also configured to communicatively connect to a central dock; and
the system comprises additional programming instructions configured to cause the processor to, upon detecting that the communication device has communicatively connected to the central dock, do one or more of the following:
receive the data payload from a server via the central dock, or
transfer a node's data payload received from the smart traffic control infrastructure node to the server via the central dock.

15. The vehicle of claim 10, further comprising:
a vehicle body;
a camera that is attached to the vehicle body and configured to capture image data of an environment along the route on which the vehicle is traveling; and
one or more other sensors attached to the vehicle body and configured to capture other sensed data along the route,
wherein the communication device is also configured to transfer the captured image data and the other sensed data to the remote server.

16. The vehicle of claim 10, wherein the data payload comprises at least one of the following:
a software update for the smart traffic control infrastructure node; or
training data for the smart traffic control infrastructure node to train a model used in machine learning.

17. A method of transferring data between an autonomous vehicle and a vehicle traffic control infrastructure system, the method comprising:
receiving, by a communication device of a vehicle, a data payload for a smart traffic control infrastructure node;
by a computing device of the vehicle:
determining that the vehicle is or will be within a communication range of the smart traffic control infrastructure node,
determining a length of time that the vehicle will be in the communication range of the smart traffic control infrastructure node, and
assembling a first communication package with at least a portion of the data payload that can be transferred in the determined length of time; and
by a communication device of the vehicle when the vehicle has an ad hoc communication link with the smart traffic control infrastructure node, transmitting the first communication package to the smart traffic control infrastructure node;
by the smart traffic control infrastructure node:
receiving, by a communication device of the smart traffic control infrastructure node, the first communication package,
updating, by a processor of the smart traffic control infrastructure node, memory or software of the smart node with the received portion of the data payload in the first communication package, and
tracking, by the processor of the smart traffic control infrastructure node, an identifier associated with the received portion of the data payload;
wherein:
the vehicle travels a route,
the route includes repeating a route portion of the route along which the smart traffic control infrastructure node is located, and
the method further comprises:
by the computing device of the vehicle, while the vehicle is repeating the route portion of the route:
detecting that the vehicle is within the communication range of the smart traffic control infrastructure node;
determining that the data payload includes a second portion that was not transmitted to the smart traffic control infrastructure node in the assembled communication package; and assembling a second communication package with the second portion of the data payload for transmission, and by the communication device of the vehicle, transmitting the second communication package with the second portion to the smart traffic control infrastructure node while the vehicle is repeating the route portion and within the communication range of the smart traffic control infrastructure node.

18. The method of claim 17, wherein receiving the data payload comprises doing so from one of the following:
a remote server;
a peer data carrier device; or
another smart traffic control infrastructure node.

19. The method of claim 17, further comprising:
by the smart traffic control infrastructure node:
detecting that the vehicle is within the communication range of the smart node traffic control infrastructure while repeating the route portion, and
upon detecting that the vehicle is within the communication range of the smart traffic control infrastructure node while repeating the route portion, retrieving an identifier representative of an amount of previously received data of the payload; and
transmitting, by the communication device of the smart traffic control infrastructure node, the retrieved identifier to the communication device of the vehicle.

20. The method of claim 17, further comprising:
receiving, by the communication device of the vehicle, a node's data payload from the smart traffic control infrastructure node;
determining, by the computing device of the vehicle, a transfer destination for transfer of the node's data payload; and
by the communication device of the vehicle, performing one or more of the following:
(i) connecting to a remote server to transfer the node's data payload, in response to the determined transfer destination being the remote server,
(ii) connecting to another smart node to transfer the node's data payload, in response to the determined transfer destination being the another smart node; or
(iii) connecting to a peer data carrier device to transfer the node's data payload, in response to the determined transfer destination being the peer data carrier device.

21. The method of claim 17, further comprising:
by the communication device of the vehicle, communicatively connecting to a central dock; and
wherein receiving the data payload comprises receiving the data payload from a server via the central dock.

22. The method of claim 17, wherein the data payload comprises at least one of the following:
a software update for the smart traffic control infrastructure node; or
training data for the smart traffic control infrastructure node to train a model used in machine learning.

23. A vehicle comprising:
a sensor configured to sense a location along a route;
a processor;
a communication device; and
a computer readable medium having programming instructions that, when executed, will cause the processor to:
receive a data payload for a smart traffic control infrastructure node,
during a run of the vehicle, determine when the vehicle is or will be within communication range of the smart traffic control infrastructure node,
determine a length of time that the vehicle will be in a communication range of the smart traffic control infrastructure node,
assemble a first communication package with at least a portion of the data payload,
while the vehicle has an ad hoc communication link with the smart traffic control infrastructure node, cause the communication device to transmit the first communication package to the smart traffic control infrastructure node,
track an amount of data of the data payload transferred to the smart traffic control infrastructure node, and
while the vehicle is repeating a portion of the route that is within communication range of the smart traffic control infrastructure node:
detect that the vehicle is again within the communication range of the smart traffic control infrastructure node;
determine that the data payload includes a second portion that was not transmitted to the smart traffic control infrastructure node in the assembled communication package;
assemble a second communication package with the second portion of the data payload for transmission; and
cause the communication device to transmit the second communication package with the second portion of the data payload to the smart traffic control infrastructure node while the vehicle is repeating the portion of the route that is within the communication range of the smart traffic control infrastructure node.

24. The vehicle of claim 23, further comprising additional programming instructions that are configured to cause the processor to:
detect that the communication device has received a node's data payload from the smart traffic control infrastructure node;
determine a transfer destination for the node's data payload, wherein the transfer destination comprises one or more of the following:
(i) a remote server,
(ii) another smart node, or
(iii) a peer data carrier device; and
upon detecting that the communication device has communicatively connected to the transfer destination, cause the communication device to transfer the node's data payload to the transfer destination.

25. The vehicle of claim 23, wherein:
the communication device is also configured to communicatively connect to a central dock; and
the system comprises additional programming instructions configured to cause the processor to, upon detecting that the communication device has communicatively connected to the central dock, do one or more of the following:
receive the data payload from a server via the central dock, or
transfer a node's data payload received from the smart traffic control infrastructure node to the server via the central dock.

26. The vehicle of claim 23, further comprising:
a vehicle body;
a camera that is attached to the vehicle body and configured to capture image data of an environment along the route on which the vehicle is traveling; and
one or more other sensors attached to the vehicle body and configured to capture other sensed data along the route,
wherein the communication device is also configured to transfer the captured image data and the other sensed data to the remote server.

27. The vehicle of claim 23, wherein the data payload comprises at least one of the following:
a software update for the smart traffic control infrastructure node; or
training data for the smart traffic control infrastructure node to train a model used in machine learning.

\* \* \* \* \*